(12) United States Patent
Trajkovic

(10) Patent No.: US 7,151,562 B1
(45) Date of Patent: Dec. 19, 2006

(54) METHOD AND APPARATUS FOR EXTERNAL CALIBRATION OF A CAMERA VIA A GRAPHICAL USER INTERFACE

(75) Inventor: Miroslav Trajkovic, Ossining, NY (US)

(73) Assignee: Koninklijke Philips Electronics N.V., Eindhoven (NL)

(\*) Notice: Subject to any disclaimer, the term of this patent is extended or adjusted under 35 U.S.C. 154(b) by 1266 days.

(21) Appl. No.: 09/634,731

(22) Filed: Aug. 3, 2000

(51) Int. Cl.
  *H04N 5/232* (2006.01)
  *H04N 7/18* (2006.01)

(52) U.S. Cl. .................... 348/211.13; 348/211.12

(58) Field of Classification Search ............ 348/211.8, 348/211.13, 211.14, 211.99, 207.1, 157, 143; 702/85, 94, 150, 152, 153; 382/106
See application file for complete search history.

(56) References Cited

U.S. PATENT DOCUMENTS

| | | | | |
|---|---|---|---|---|
| 5,526,041 A | * | 6/1996 | Glatt | 348/143 |
| 5,627,616 A | * | 5/1997 | Sergeant et al. | 348/143 |
| 5,699,444 A | * | 12/1997 | Palm | 382/106 |
| 5,918,192 A | * | 6/1999 | Tomaszewski | 702/85 |
| 5,930,740 A | * | 7/1999 | Mathisen | 702/152 |
| 6,301,372 B1 | * | 10/2001 | Tanaka | 382/106 |
| 6,594,600 B1 | * | 7/2003 | Arnoul et al. | 702/94 |

OTHER PUBLICATIONS

Richard I. Hartley, "Self Calibration of Stationary Cameras", Kluwer Academic Publishers, 1997, pp. 7-23.

\* cited by examiner

*Primary Examiner*—Luong T. Nguyen

(57) ABSTRACT

A camera of a camera-based image processing system is calibrated using a graphical user interface (GUI) of the system. A representation of an area in which the camera is to be operated is presented via the GUI, and calibration information is obtained for each of a set of one or more calibration points sequentially as the camera is pointed to corresponding positions in the area. For each of the one or more calibration points, the calibration information is obtained after a command is entered identifying a corresponding position of the calibration point within the representation of the area as presented via the GUI. An external calibration including camera position and orientation is then computed for the camera based on the calibration information obtained for the one or more calibration points.

23 Claims, 2 Drawing Sheets

METHOD AND APPARATUS FOR EXTERNAL CALIBRATION OF A CAMERA VIA A GRAPHICAL USER INTERFACE

FIELD OF THE INVENTION

The present invention relates generally to the field of image signal processing, and more particularly to techniques for calibrating pan-tilt-zoom (PTZ) cameras and other types of cameras in video conferencing systems, video surveillance systems and other camera-based systems.

BACKGROUND OF THE INVENTION

In camera-based image processing systems, such as video conferencing systems, video surveillance and monitoring systems, and human-machine interfaces, it is important to provide a proper calibration for the camera or cameras of the system. For example, in a video conferencing system, it is often desirable to frame the head and shoulders of a particular conference participant in the resultant output video signal, while in a video surveillance system, it may be desirable to frame the entire body of, e.g., a person entering or leaving a restricted area monitored by the system. Accurate performance of such detection and tracking operations generally requires that the cameras involved be properly calibrated.

The calibration process for a given camera may include both an internal calibration and an external calibration. The internal calibration involves camera parameters such as principal point, focal length, and mapping from zoom ticks to focal length. The external calibration involves a determination of the position and orientation of the camera, and may include estimates of pan and tilt biases.

Conventional calibration techniques suffer from a number of significant drawbacks. For example, such techniques are often computationally expensive and may not provide a desired level of stability.

A number of camera-based image processing systems exist which incorporate a graphical user interface (GUI). However, such systems generally utilize the GUI for purposes unrelated to camera calibration. The calibration in such systems is generally performed using one of more of the above-noted conventional techniques, without utilization of the GUI.

It is apparent from the foregoing that a need exists for improved techniques for camera calibration in camera-based image processing systems.

SUMMARY OF THE INVENTION

The invention provides methods and apparatus for calibration of a camera used to generate a video signal or other type of image signal in a camera-based image processing system.

In accordance with one aspect of the invention, a camera of a camera-based image processing system is calibrated using a graphical user interface (GUI) of the system. A representation of an area in which the camera is to be operated is presented via the GUI, and calibration information is obtained for each of a set of one or more calibration points sequentially as the camera is pointed to corresponding positions in the area. For each of the one or more calibration points, the calibration information is obtained after a command is entered identifying a corresponding position of the calibration point within the representation of the area as presented via the GUI. An external calibration including camera position and orientation may then be computed for the camera based on the calibration information obtained for the one or more calibration points.

By way of example, the set of calibration points may include only a single calibration point, in which case the computed information may include only a pan bias for the camera. As another example, calibration information obtained for at least three calibration points may be used to compute both a two-dimensional position of the camera and a pan bias of the camera. As yet another example, calibration information obtained from three additional calibration points may be used to compute a tilt bias of the camera.

In accordance with another aspect of the invention, the system may be configured to estimate a pan bias for the camera using the calibration information and assuming that the camera position is known and the tilt bias is zero. The system may also be configured to estimate a camera position and a pan bias for the camera using the calibration information and assuming that the camera height is known and the tilt bias is zero. In any case, a tilt bias may be estimated for the camera after first determining a camera position and a pan bias for the camera.

Advantageously, a calibration process in accordance with the present invention overcomes one or more of the above-noted problems associated with conventional calibration techniques. For example, the calibration techniques of the invention are generally less computationally expensive and more stable than conventional techniques. The techniques of the invention can be used in a wide variety of image processing applications, including camera-based systems such as video conferencing systems, video surveillance and monitoring systems, and human-machine interfaces. These and other features and advantages of the present invention will become more apparent from the accompanying drawings and the following detailed description.

DETAILED DESCRIPTION OF THE INVENTION

Figure 1:
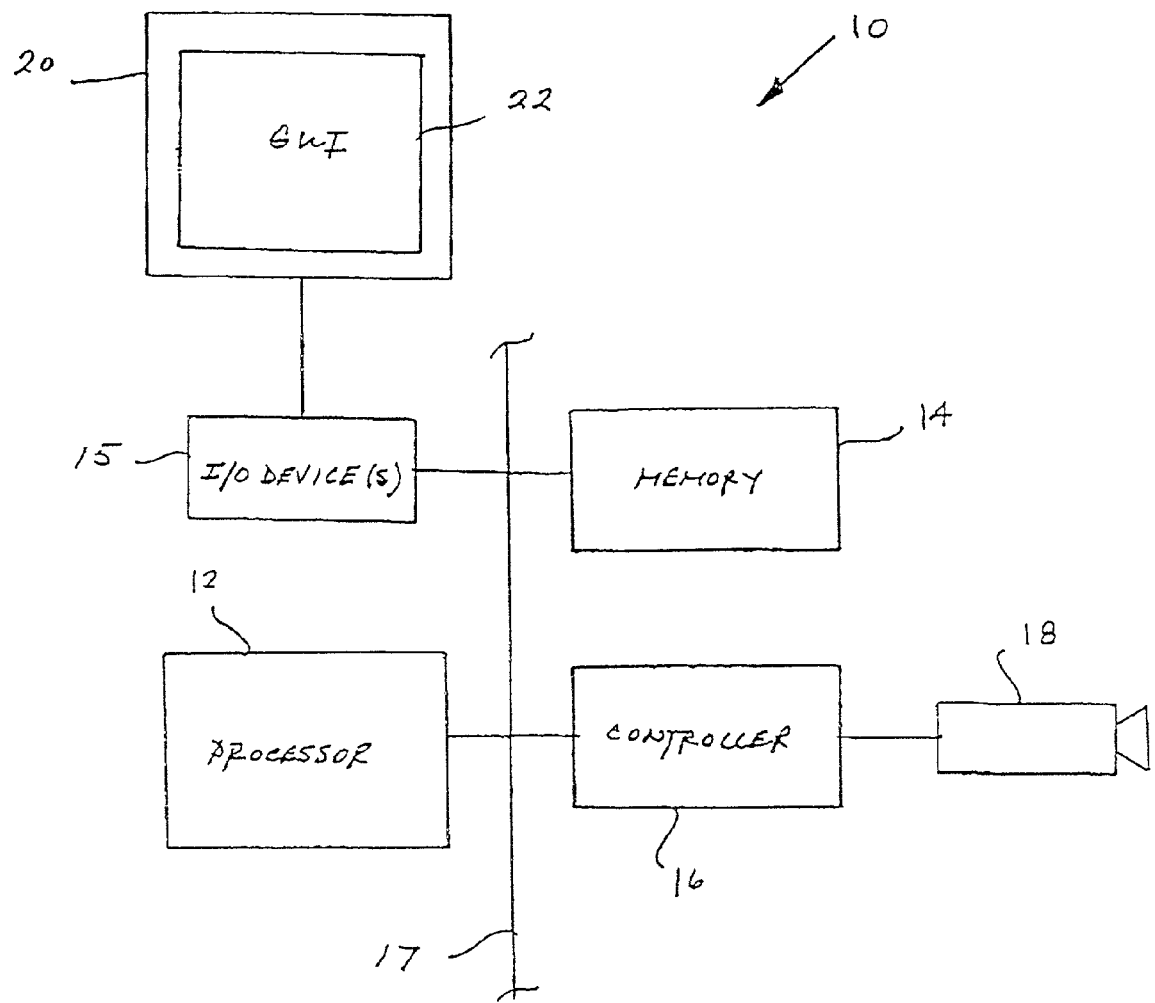
FIG. 1 is a block diagram of a camera-based image processing system in which the present invention may be implemented.

FIG. 1 shows a camera-based image processing system 10 in which the camera calibration techniques of the present invention may be implemented. The system 10 includes a processor 12, a memory 14, a set of one or more input/output (I/O) device(s) 15 and a controller 16, all connected to communicate over a system bus 17. The system 10 further includes a camera 18 that is coupled to the controller 16 as shown. The camera 18 may be, e.g., a pan-tilt-zoom (PTZ) camera, a zoom camera or any other suitable image capture device. The term "camera" as used herein is therefore intended to include any type of image capture device.

Also part of the system 10 is a display 20 which provides a graphical user interface (GUI) 22 for use in implementing a camera calibration process in accordance with the invention. The display 20 is coupled to one or more of the I/O devices 15, and the GUI 22 presented thereon may be generated by execution of one or more software programs via processor 12 and memory 14 of system 10. As will be described in greater detail below, the GUI 22 as part of a calibration process presents a map of a room or other area in which the camera 18 is to be operated and for which calibration is desired. The term "map" as used herein is intended to include any type of displayed representation of a room or other area, configured such that one or more calibration points in the room or other area to which a user may point a camera have a corresponding point or points in the displayed representation.

Although not shown explicitly in FIG. 1, additional elements may be present in the system 10. For example, coupled to one or more of the I/O devices 15 may be a mouse or other point-and-click device, a keyboard, a printer, disk drive or other peripheral, or other types of well-known devices.

The system 10 may be adapted for use in any of a number of different image processing applications, including, e.g., video conferencing, video surveillance and monitoring, human-machine interfaces, etc. More generally, the system 10 can be used in any application which can benefit from the improved calibration capabilities provided by the present invention.

Elements or groups of elements of the system 10 may represent corresponding elements of an otherwise conventional desktop or portable computer, as well as portions or combinations of these and other processing devices. Moreover, in other embodiments of the invention, some or all of the functions of the processor 12, controller 16 or other elements of the system 10 may be combined into a single device. For example, one or more of the elements of system 10 may be implemented as an application specific integrated circuit (ASIC) or circuit card to be incorporated into a computer, television, set-top box or other processing device.

The term "processor" as used herein is intended to include a microprocessor, central processing unit (CPU), digital signal processor (DSP), microcontroller or any other data processing element that may be utilized in a given data processing device, as well as combinations or portions of these elements. In addition, it should be noted that the memory 14 may represent an electronic memory, an optical or magnetic disk-based memory, a tape-based memory, as well as combinations or portions of these and other types of storage devices.

The present invention in an illustrative embodiment provides a camera calibration process that makes use of the GUI 22 of the system 10.

Figure 2:
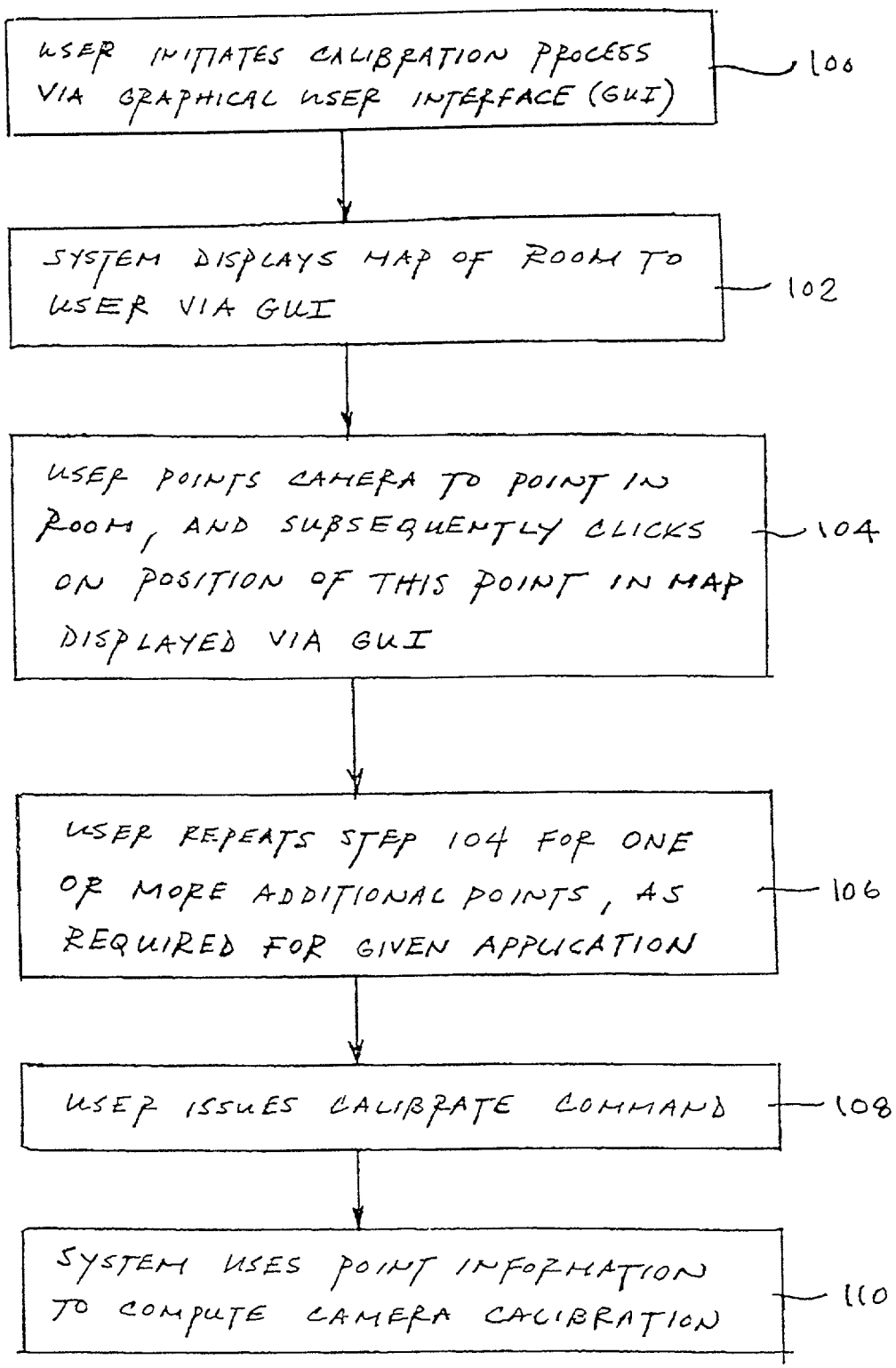
FIG. 2 is a flow diagram showing the operation of an exemplary camera calibration process in accordance with an illustrative embodiment of the invention.

FIG. 2 is a flow diagram of the camera calibration process in the illustrative embodiment of the invention. It is assumed for purposes of illustration only that the camera 18 is a PTZ camera arranged in a room or other area to be monitored, and that the pan, tilt, zoom and other parameter settings of the camera can be controlled by a user, e.g., via the GUI 22 or other appropriate interface.

In step 100 of FIG. 2, a user initiates the calibration process via the GUI 22. For example, the user may initiate the process in response to a displayed icon or other indicator directing or suggesting that the user perform a calibration. As another example, the calibration may be part of a system set-up procedure. The system in step 102 responds to initiation of the calibration procedure by displaying to the user via the GUT 22 a map of the room or other area to be monitored. As noted previously, this map is a representation of the room or other area, and includes one or more points corresponding to points in the room or other area that the user may select as calibration points.

In step 104, the user utilizes the pan, tilt and zoom controls of the camera 18 to point the camera to a selected calibration point in the room or area. This point may be selected by the user without input from the system. Alternatively, one or more suggested calibration points may be made apparent to the user, e.g., via the GUI 22 or any other suitable interface. The user points the camera such that the selected calibration point is positioned in a particular manner within an image generated by the camera, e.g., in the middle of the image. This allows the spherical coordinates of the selected point to be obtained in the camera coordinate system, as will be described in greater detail below.

Once the camera is pointed to the selected point, the user then clicks on the corresponding position in the map displayed via the GUI 22, using a mouse or other point-and-click device, a keyboard, or any other type of input device. This allows the system to obtain the position of the point in a desired world coordinate system, as will also be described in greater detail below.

As indicated in step 106, the process described in conjunction with step 104 may be repeated for each of one or more additional calibration points selected by the user. Each of these calibration points thus yields a calibration measurement for a given camera setting. It should be noted that the minimal number of points required will depend on the particular result that the user wants to achieve. For example, if the user wants to calibrate the camera only for pan bias, then a single calibration point will generally be sufficient. However, if the user wants to calibrate the camera for position, without height, as well as the pan bias, three points will generally be required, and for tilt bias, three additional points will generally be required. The number of times step 104 is repeated is thus dependent upon the particular calibration application.

After step 106 is complete, the user issues a CALIBRATE command in step 108, and in step 110 the system responds by computing a calibration for the camera based on the information gathered in step 104 for the various selected calibration points. The computed calibration in this embodiment may include the position and orientation of the camera in a predefined world coordinate system. The CALIBRATE command in step 108 may be generated via a point-and-click device, keyboard, etc. using information displayed via the GUI 22.

The manner in which the system 10 performs the calibration computations in step 110 of FIG. 2 will now be described in greater detail.

Camera 18 may be viewed for purposes of illustration as a device that maps points from a three-dimensional (3D) "world" onto a two-dimensional (2D) image plane. In order to perform measurements back from the image plane to the 3D world, it is generally necessary to compute certain camera parameters. This process is generally referred to herein as "camera calibration." Such calibration may involve the use of a projective camera model with the mathematical form given below:

$$sp = Q(RP+T), \quad (1)$$

where p denotes the image coordinates of a world point P, s denotes the projective scale factor, Q is an internal camera calibration matrix, and R and T are the rotation and translation, respectively, that align the camera and world coordinate systems. This type of calibration represents a type of external calibration, i.e., an estimation of the position and orientation of the camera. The internal camera calibration matrix Q used in the external calibration process is of the form:

$$Q = \begin{bmatrix} f & 0 & x_0 \\ 0 & f & y_0 \\ 0 & 0 & 1 \end{bmatrix}, \quad (2)$$

where $(x_0, y_0)$ denotes the principal point of the camera, i.e., the intersection between the optical axes and the imaging plane of the camera, and f denotes the focal length of the camera. Note that these internal camera calibration parameters are expressed in pixels.

The present invention in the illustrative embodiment provides a camera calibration that can be performed using only one-point correspondence between several pairs of images, and thus with considerably reduced complexity relative to conventional techniques. It is assumed for purposes of clarity and simplicity of illustration that the centers of rotation of the pan and tilt mechanisms of the camera coincide with the center of the camera. The distance between these points is usually small and therefore this assumption is appropriate.

Let $OX_wY_wZ_w$ denote the 3D coordinate system of the room or other area monitored by the camera, and let C denote the location of the camera. This 3D coordinate system is also referred to herein as the above-noted world coordinate system. Let $Cx'_c y'_c z'_c$ denote the camera coordinate system for zero pan and tilt angles and let the $z'_c$ axis coincide with the optical axis of the camera.

If a user wants to point the camera toward a point A, the user may rotate the camera around the pan and tilt axes by the angles $\alpha_m$ and $\beta_m$ respectively. To compute these angles, one needs to know the world coordinates of the camera ($X_C$, $Y_C$, $Z_C$) and point A ($X_i$, $Y_i$, $Z_i$), and the orientation of the camera in the world coordinate system, or more conveniently, the orientation of the camera in the normalized camera coordinate system $Cx_c y_c z_c$, obtained by translating the world coordinate system from O to C.

The camera orientation can be represented by the angles $\alpha_{offset}$, $\beta_{offset}$ and $\gamma_{offset}$ and these angles will be referred to herein as the pan bias, tilt bias and roll bias, respectively. In place of the tilt bias and roll bias it may be convenient to use as substitutes the quantities $\phi_x = \beta \cos \gamma$, $\phi_y = \beta \sin \gamma$, respectively.

Furthermore, one can define the tilt bias as a function of the pan angle such that it will have the form:

$$\phi(\alpha) = \phi_x \cos \alpha + \phi_y \sin \alpha. \quad (3)$$

For each camera setting, the following two equations can be derived:

$$\alpha_i + \alpha_{offset} = \operatorname{atan} 2\left(\frac{Y_{iC} - \varphi_y Z_{iC}}{X_{iC} - \varphi_x Z_{iC}}\right) \quad (4)$$

$$\tau_i + \varphi(\alpha_i) = \operatorname{atan}\left(\frac{Z_{AC}}{\sqrt{X_{iC}^2 + Y_{iC}^2}}\right).$$

where $X_{iC} = X_i - X_C$, $Y_{iC} = Y_i - Y_C$, $Z_{iC} = Z_i - Z_C$,

Given n different camera settings (n≥3), the camera calibration parameters may be estimated by minimizing the cost function corresponding to equation (5) below:

$$f(P_C, \omega) = \sum_{i=1}^{n} \left(\alpha_i + \alpha_{off} - \operatorname{atan} 2\frac{Y_{iC} - \varphi_y Z_{iC}}{X_{iC} - \varphi_x Z_{iC}}\right)^2 + \sum_{i=1}^{n} \left(\tau_i + \varphi(\alpha_i) - \operatorname{atan} \frac{Z_{iC}}{\sqrt{X_{iC}^2 + Y_{iC}^2}}\right)^2 \quad (5)$$

where $P_C = (X_C, Y_C, Z_C)$ and $\omega = (\alpha_{offset}, \phi_x, \phi_y)$.

A number of algorithms for use in determining camera position and orientation in accordance with the present invention will now be described in greater detail. The first algorithm to be described assumes that the camera position is known and that the tilt bias can be approximated to zero, and estimates the pan bias. only a single calibration point is required in this case. The second algorithm assumes that the camera position is unknown, and estimates the camera position and the pan bias assuming that the tilt bias is approximately zero. This algorithm utilizes three calibration points. The third algorithm estimates the tilt bias assuming that the camera position and the pan bias are known, and uses three additional calibration points.

As noted previously, each calibration point corresponds to a particular set of camera settings.

The order in which the above-noted algorithms are presented herein follows one possible implementation of the invention. More particularly, one can first use a set of at least three camera settings, for which the tilt bias can be neglected, to compute the pan bias and camera position using the first or second algorithms noted above. Then, knowing the pan bias and camera position, one can use another set of at least three camera settings to compute the tilt bias using the third algorithm.

The first algorithm referred to above estimates the pan bias from equations (4) and (5). The simplest scenario occurs if the camera position is exactly known and the tilt bias is assumed to be zero. In this case, the pan bias can be estimated directly from (4), and for n measurements, the least squares solution is given by:

$$\alpha_{offset} = \frac{1}{n}\sum_{i=1}^{n} (\operatorname{atan} 2(Y_{iC}, X_{iC}) - \alpha_i). \quad (6)$$

For better precision, it is advisable to choose reference world points to be at a height similar to that of the camera. In this case the term $Z_{iC}$ in (4) will be close to zero, and as the tilt bias ($\phi_x$ and $\phi_y$) is usually close to zero, the terms $\phi_x Z_{iC}$ and $\phi_y Z_{iC}$ in (4) can be neglected.

The second algorithm referred to above estimates both camera position and pan bias. Assume that only the camera height is known and that the $X_C$ and $Y_C$ components of the camera position are only approximate. As before, it can again be assumed that the tilt bias is zero.

The camera position and pan bias can now be computed using the following linear algorithm. Consider the first equation in (4) assuming $\phi_x \approx \phi_y = 0$. This equation now becomes:

$$\alpha_i + \alpha_{offset} = a\tan 2\left(\frac{Y_i - Y_C}{X_i - X_C}\right). \quad (6a)$$

After applying the tangent operation to both sides of equation (6a) and rearranging terms, the result can be written as:

$$m_0(X_i + Y_i t_i) - m_1 - m_2 t_i - (Y_i - t_i X_i) = 0, \quad (6b)$$

where:

$$t_i = \tan \alpha_i, m_0 = \tan \alpha,$$

$$m_1 = tX_C - Y_C, m_2 = X_C + tY_C$$

Given three or more measurements $(\alpha_i, X_i, Y_i)$, the vector $m = [m_0 \ m_1 \ m_2]$ as defined above can be determined using a method such as least squares. Once m is computed, the camera position and pan bias can be easily found.

It should be noted that this linear algorithm can produce acceptable results for a number of different applications. However, since it minimizes a cost function associated with equation (6b), which is different from the optimal cost function associated with equation (6a), the linear algorithm does not produce the optimal result.

The optimal camera position and pan bias can be estimated by minimizing the following cost function (7) associated with the first equation in (4):

$$f(X_C, Y_C - \alpha_{offset}) = \sum_{i=1}^{n} (\alpha_i + \alpha_{offset} - a\tan 2(Y_{iC}, X_{iC}))^2 \quad (7)$$

As this is a nonlinear function, the solution generally has to be found numerically. For example, one can use conjugate gradients to minimize the cost function, and the solution with a precision on the order of 0.0001 is typically found in three to four iterations. As initial values, one can use the solution obtained from the linear algorithm.

The third algorithm referred to above estimates the tilt bias. As previously noted, in one possible implementation of the invention, the tilt bias is estimated after the camera position and the pan bias have been computed. In this case, the tilt bias can be estimated from the second equation in (4). However, better results may be obtained using the following empirical model instead of the second equation in (4):

$$\phi(\alpha) = \phi_0 + \phi_x \cos a + \phi_y \sin \alpha. \quad (8)$$

The factor $\phi_0$ in equation (8) accounts for the mechanical imperfection of the tilt mechanism and the fact that the camera may be unable to produce zero tilt. Experimental results justify the introduction of this factor and indicate a significant reduction in prediction error.

Substituting equation (8) into the second equation in (4) results in:

$$\varphi_0 + \varphi_x \cos\alpha + \varphi_y \sin\alpha = a\tan\left(\frac{Z_{iC}}{\sqrt{X_{iC}^2 + Y_{iC}^2}}\right) - \tau_i, \quad i = 1, \ldots, n. \quad (9)$$

Equation (9) is linear in $\phi = (\phi_0, \phi_x, \phi_y)$ and the tilt bias parameters can be estimated using least squares and solving a system of three linear equations in $\phi$. The minimum number of points required in this case is n=3.

In order to obtain the estimate of $Z_{iC}$, one may choose the world points with known heights. For example, these points may be on the floor of a given room. If the points are chosen on the ceiling of the room, then the term atan $$\left(\frac{Z_{iC}}{\sqrt{X_{iC}^2 + Y_{iC}^2}}\right) - \tau_i$$

becomes unreliable, so these points should not be used.

It is also possible to obtain the tilt bias by minimizing the cost function (5) assuming that the camera position and the pan bias are known. However, experimental results suggest that this approach may not produce acceptable results.

It should be noted that the invention does not require the use of any particular type of internal calibration process. The internal calibration matrix Q referred to herein can be generated using any of a number of well-known conventional techniques.

The above-described embodiments of the invention are intended to be illustrative only. For example, the invention can utilize other types of algorithms to estimate camera position, pan bias, tilt bias and other parameters described herein. As previously noted, the invention can be used in a wide variety of camera-based system applications, including video conferencing systems, video surveillance and monitoring systems, and other camera-based systems. The invention does not require the use of any particular type of camera or configuration of processing elements. The invention can be implemented at least in part in the form of one or more software programs which are stored on an electronic, magnetic or optical storage medium and executed by a processing device, e.g., by the processor 12 of system 10. These and numerous other embodiments within the scope of the following claims will be apparent to those skilled in the art.

What is claimed is:

1. A method for calibrating a camera of a camera-based image processing system, the method comprising the steps of:

presenting via a graphical user interface a representation of an area in which the camera is to be operated;

selecting at least one calibration point presented in the representation;

obtaining, responsively to said selecting, calibration information for each selected point sequentially as the camera is pointed to corresponding positions in the area, wherein, in case of more than one calibration point, the pointing to any next one of said corresponding positions amounts to rotating, in place, around a pan axis of the camera, a tilt axis of the camera or both axes;

entering, for said each selected point, a command identifying a corresponding position of the selected point within said representation; and computing at least one of position and orientation information for the camera based on the obtained calibration information.

2. The method of claim 1, wherein said at least one calibration point comprises a single calibration point and the computed information comprises a pan bias for the camera.

3. A method for calibrating a camera of a camera-based image processing system, the method comprising the steps of:

presenting via a graphical user interface a representation of an area in which the camera is to be operated;

obtaining calibration information for each of at least three calibration points sequentially as the camera is pointed to the corresponding positions in the area, wherein the pointing to any next one of said corresponding positions amounts to rotating, in place, around a pan axis of the camera, a tilt axis of the camera or both axes and, for each of the calibration points, a command is entered identifying a corresponding position of the calibration point within the representation of the area as presented via the graphical user interface; and computing at least one of position and orientation information for the camera based on the calibration information obtained for the calibration points, wherein the computer information comprises a two-dimensional position of the camera and a pan bias of the camera.

4. The method of claim 1, wherein said at least one calibration point constitute a set comprised of at least three calibration points, and the computed information comprises a tilt bias of the camera.

5. The method of claim 1 wherein a user points the camera to a position of said corresponding positions by adjusting at least one of a pan setting, a tilt setting and a zoom setting of the camera.

6. The method of claim 1 wherein the obtaining step is carried out for said corresponding position upon receipt of the command.

7. The method of claim 1 wherein the area in which the camera is to be operated comprises a room, at least a portion of which is monitored by the camera.

8. The method of claim 1 wherein the orientation information comprises at least one of a pan bias and a tilt bias.

9. The method of claim 1 wherein the computing step computes a pan bias for the camera using the calibration information and assuming that the camera position is known and the tilt bias is zero.

10. The method of claim 1 wherein the computing step computes a camera position and a pan bias for the camera using the calibration information and assuming that a camera height is known and the tilt bias is zero.

11. The method of claim 1 wherein the computing step computes a tilt bias for the camera after first determining a camera position and a pan bias for the camera.

12. An apparatus for use in calibrating a camera of a camera-based image processing system, the apparatus comprising:

a processor operative: (i) to present via a graphical user interface a representation of an area in which the camera is to be operated; (ii) to select at least one calibration point presented in the representation; (iii) to obtain, responsively to said selecting, calibration information for each selected point sequentially as the camera is pointed to corresponding positions in the area, wherein, in case of more than one calibration point, the pointing to any next one of said corresponding positions amounts to rotating, in place, around a pan axis of the camera, a tilt axis of the camera or both axes and, to enter, for each said selected point, a command identifying a corresponding position of the selected point within said representation; and (iv) to compute at least one of position and orientation information for the camera based on the obtained calibration information; and a memory coupled to the processor and operative to store at least a portion of the obtained calibration information.

13. The apparatus of claim 12 wherein said at least one calibration point comprises a single calibration point and the computed information comprises a pan bias for the camera.

14. The apparatus of claim 12, wherein said at least one calibration point constitute a set comprised of at least three calibration points, and the computed information comprises a two-dimensional position of the camera and a pan bias of the camera.

15. The apparatus of claim 12 wherein said at least one calibration point constitute a set comprised of at least three calibration points, and the computed information comprises a tilt bias of the camera.

16. The apparatus of claim 12 wherein a user points the camera to a position in the area corresponding to a given one of the calibration points by adjusting at least one of a pan setting, a tilt setting and a zoom setting of the camera.

17. The apparatus of claim 12 wherein the respective calibration information is obtained for said corresponding position upon receipt of the command.

18. The apparatus of claim 12 wherein the area in which the camera is to be operated comprises a room, at least a portion of which is monitored by the camera.

19. The apparatus of claim 12 wherein the orientation information comprises at least one of a pan bias and a tilt bias.

20. The apparatus of claim 12 wherein the processor is further operative to compute a pan bias for the camera using the calibration information and assuming that the camera position is known and the tilt bias is zero.

21. The apparatus of claim 12, wherein the processor is further operative to compute a camera position and a pan bias for the camera using the calibration information and assuming that a camera height is known and the tilt bias is zero.

22. The apparatus of claim 12, wherein the processor is further operative to compute a tilt bias for the camera after first determining a camera position and a pan bias for the camera.

23. An article of manufacture comprising a storage medium for storing one or more programs for use in calibrating a camera of a camera-based image processing system, wherein the one or more programs when read and executed by a processor implement the steps of:

presenting via a graphical user interface a representation of an area in which the camera is to be operated;

selecting at least one calibration point presented in the representation;

obtaining, responsively to said selecting, calibration information for each selected point sequentially as the camera is pointed to corresponding positions in the area, wherein, in case of more than one calibration point, the pointing to any next one of said corresponding positions amounts to rotating, in place, around a pan axis of the camera, a tilt axis of the camera or both axes;

entering, for said each selected point, a command identifying a corresponding position of the selected point within said representation; and computing at least one of position and orientation information for the camera based on the obtained calibration information.

* * * * *